US006587464B1

(12) United States Patent
Brown et al.

(10) Patent No.: US 6,587,464 B1
(45) Date of Patent: *Jul. 1, 2003

(54) METHOD AND SYSTEM FOR PARTIAL REPORTING OF MISSING INFORMATION FRAMES IN A TELECOMMUNICATION SYSTEM

(75) Inventors: Michael Anthony Brown, Plano, TX (US); Richard K. Doll, Plano, TX (US); Martin Louis Joseph Gallant, Garland, TX (US); Scott William Noble, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/227,683

(22) Filed: Jan. 8, 1999

(51) Int. Cl.[7] ................................................ H04L 12/28
(52) U.S. Cl. ...................... 370/394; 370/449; 370/428; 370/524; 714/701; 714/746; 714/748; 714/712
(58) Field of Search ................................ 370/449, 394, 370/428, 524; 714/701, 746, 748, 712

(56) References Cited

FOREIGN PATENT DOCUMENTS

EP           0794630 A2    9/1997

OTHER PUBLICATIONS

09/227674, Method and System for Sequential Ordering of Missing Sequence Numbers in SREJ Frames in a Telecommunication System, Jan. 8, 1999.*
U.S. patent application Ser. No. 09/227,674, Brown et al., filed Jan. 8, 1999, Related Copending Application.

Brady, P.T., "Performance Evaluation of Multi–Reject and Selective Reject Link–Level Protocol Enhancements", Proceedings of the Global Telecommunications Conference and Exhibition (Globecom), US, New York, IEEE, Dec. 1986, pp. 105–109.
Peyravian, Mohammad, "An Improved Selective Repeat Protocol and its Performance in High–Speed Environments", Computer Networks and ISDN Systems, NL, North Holland Publishing, Amsterdam, vol. 26, No. 12, Sep. 1, 1994, pp. 1595–1605.

* cited by examiner

Primary Examiner—Douglas Olms
Assistant Examiner—Van Nguyen
(74) Attorney, Agent, or Firm—John D. Crane; Bracewell & Patterson, L.L.P.

(57) ABSTRACT

A method and system for partial reporting of missing sequence numbered information frames within a telecommunication system using selective reject (SREJ) frames. Upon receiving a sequence numbered information frame from a transmit terminal, a receive terminal determines if it is out of sequence. If the sequence numbered information frame is out of sequence, the receive terminal further checks the sequence numbered information frame to see if a poll bit has been set. If the poll bit is not set, the receive terminal further checks to see if the sequence numbered information frame is new or retransmitted. If the sequence numbered information frame is new, a list of missing sequence numbers is constructed beginning with the missing sequence number one greater than the largest number in the receive queue and ending with N(S)–1. If the sequence numbered information frame is retransmitted, a list of missing sequence numbers is constructed beginning with the next smaller missing sequence number in the receive queue plus one and ending with N(S)–1. Thereafter, a select reject frame (SREJ) is sent to the transmit terminal containing a list of the out-of-sequence numbered information frame(s) for re-transmittal.

20 Claims, 6 Drawing Sheets

| | Bit 8 | Bit 7 | Bit 6 | Bit 5 | Bit 4 | Bit 3 | Bit 2 | Bit 1 | Field description |
|---|---|---|---|---|---|---|---|---|---|
| 1 | 0 | 1 | 1 | 1 | 1 | 1 | 1 | 0 | Flag |
| 2 | Service Access Point Identifier (SAPI) | | | | | | C/R | EA=0 | Address Field (2 bytes) |
| 3 | Terminal Endpoint Identifier (TEI) | | | | | | | EA=1 | |
| 4 | 0 | 0 | 0 | 0 | 0 | 1 | 0 | 1 | Control Field (2 bytes) |
| 5 | N(R) = Sequence # of next expected (oldest and 1st missing) frame | | | | | | | Final Bit | |
| | Sequence # of second missing frame | | | | | | | | Information Field |
| | Span | | | | | | | | |
| | Span | | | | | | | | |
| | Sequence # of last missing frame | | | | | | | | |
| N-2 | Frame Check Sequence (MSB) | | | | | | | | Frame Check Sequence (CRC) |
| N-1 | 1 | 1 | 1 | 1 | 1 | 1 | 1 | 1 | |
| N | 0 | 1 | 1 | 1 | 1 | 1 | 1 | 0 | Flag |

Fig. 3

METHOD AND SYSTEM FOR PARTIAL REPORTING OF MISSING INFORMATION FRAMES IN A TELECOMMUNICATION SYSTEM

RELATED APPLICATIONS

The present application is related to a co-pending application entitled "METHOD AND SYSTEM FOR SEQUENTIAL ORDERING OF MISSING SEQUENCE NUMBERS IN SREJ FRAMES IN A TELECOMMUNICATION SYSTEM", Ser. No. 09/227,674, filed on even date herewith and assigned to the assignee of the present application.

BACKGROUND OF THE INVENTION

1. Technical Field

The present invention relates in general to linking in a telecommunication system and in particular to a method for partial reporting of missing information frames by use of selective reject SREJ response frames. Still more particularly, the present invention relates to a method and system for continuous link establishment when out-of-sequence information frames are transmitted between receive and transmit terminals within a telecommunication or information handling system.

2. Description of the Related Art

Today, most of the transmission between telephone exchanges is digital, but the transmission and the signaling between a local exchange and a customer is still analogue. Because different users have different requirements (telephony, fax, data) in the existing analogue network, it is necessary to use separate telephone lines with separate characteristics for the different users. To solve this problem a new universal interface has evolved. This new network evolution is called the Integrated Services Digital Network (ISDN). ISDN is a versatile network in which all kinds of information technology are transmitted in a digital format between terminals. The ISDN digital access provides the end users with the possibility of initializing end-to-end digital connections that can support a variety of services, such as: high quality speech, audio, video. telephony, video conference, as well as fax, data and image transfer capabilities.

To ensure that voice and signaling or data and signaling information can be transmitted simultaneously in ISDN with no mutual reference, multiple channels are provided on an ISDN access and are defined by the International Telecommunication Union (ITU) in a series of protocol specifications. These channels are identified as B-channels and D-channels respectively. The B-channels are used for information transfer, such as speech, text, data and images. The D-channel is used for call control signaling procedures and may also be used to carry packet-switched data. The call control signaling information on the D-channel is used to establish, supervise and release the circuit-switched connections being requested for.

Unlike the B-channels, which function as "pipes," the D-channel is associated with higher level ITU protocol specifications defined by an Open System Interconnection (OSI) model. The OSI model has 7 protocol specification layers in which layers 2 and 3 of the model form the packet-switched connections associated with the D-channel. Within the layer 3 protocol specifications for use on the D-channel is a call-control protocol component. This layer 3 signaling protocol is transferred on the D-channel using the layer 2 protocol referred to as the Link Access Procedure-D-channel (LAPD.) Although the layer 3 protocol takes care of most ISDN signaling requirements, the LAPD layer 2 protocol utilizes frames that play a very important role in terms of low-level signaling to ISDN devices. These LAPD frames contain the information to ensure that incoming calls are routed to the appropriate ISDN device, and pass the addressing information that distinguishes ISDN devices on a single line from each other.

For continuous information to be transferred between two terminals, a sequence numbered information frame is sent along the D-channel from a transmit terminal in a sequencing order to a receive terminal. The sequence numbered information frame has a predetermined byte structure recognized at the receive terminal in accordance with the ITU protocol specification. However, a problem arises due to such effects as microwave fadeout and the like, in that one or more sequence numbered information frames may be lost during transmission resulting in a loss of the sequencing order. In the past this problem has been overcome by constructing a selective reject response (SREJ) frame upon receiving any out-of-sequence numbered information frames. The SREJ frame lists all missing sequence numbered information frames starting at the first missing sequence numbered information frame and ending with the last missing sequence numbered frame prior to the received sequence information frame and re-transmitting this complete list. However, this solution may lead to redundant select reject frames being sent for the same missing sequence numbered information frames, resulting in a waste of real-time information processing.

Therefore, there is a need to minimize real-time processing effort yet at the same time providing complete coverage of possible error conditions in reporting and re-transmitting only those information frames that are out of sequence. The subject invention herein solves this problem in a new and unique manner that has not been part of the art previously.

SUMMARY OF THE INVENTION

It is therefore an object of the present invention to provide a method and system for continuously linking within a telecommunication system or information handling system.

It is yet another object of the present invention to provide a method and system for minimizing real-time processing effort yet at the same time providing complete coverage of possible error conditions within a telecommunication or information handling system.

It is still yet another object of the present invention to provide a method and system for reporting and re-transmitting only those information frames that are out of sequence within a telecommunication or information handling system.

The foregoing objects are achieved as is now described. A method and system for partial reporting of missing sequence numbered information frames within a telecommunication system using selective reject (SREJ) frames is disclosed. Upon receiving a sequence numbered information frame from a transmit terminal, a receive terminal determines if it is out of sequence. If the sequence numbered information frame is out of sequence, the receive terminal further checks the sequence numbered information frame to see if a poll bit has been set. If the poll bit is not set, the receive terminal further checks to see if the sequence numbered information frame is new or retransmitted. If the sequence numbered information frame is new, a list of missing sequence numbers is constructed beginning with the missing sequence number one greater than the largest number in the receive queue and ending with N(S)−1. If the sequence numbered information frame is retransmitted, a list of missing sequence numbers is constructed beginning with the next smaller missing sequence number in the receive queue plus one and ending with N(S)−1. Thereafter, a select reject frame (SREJ) is sent to the transmit terminal containing a list of the out-of-sequence numbered information frame(s) for retransmittal.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 depicts a SREJ response frame in accordance with a preferred embodiment of the present invention;

DETAILED DESCRIPTION OF A PREFERRED EMBODIMENT

Figure 1:
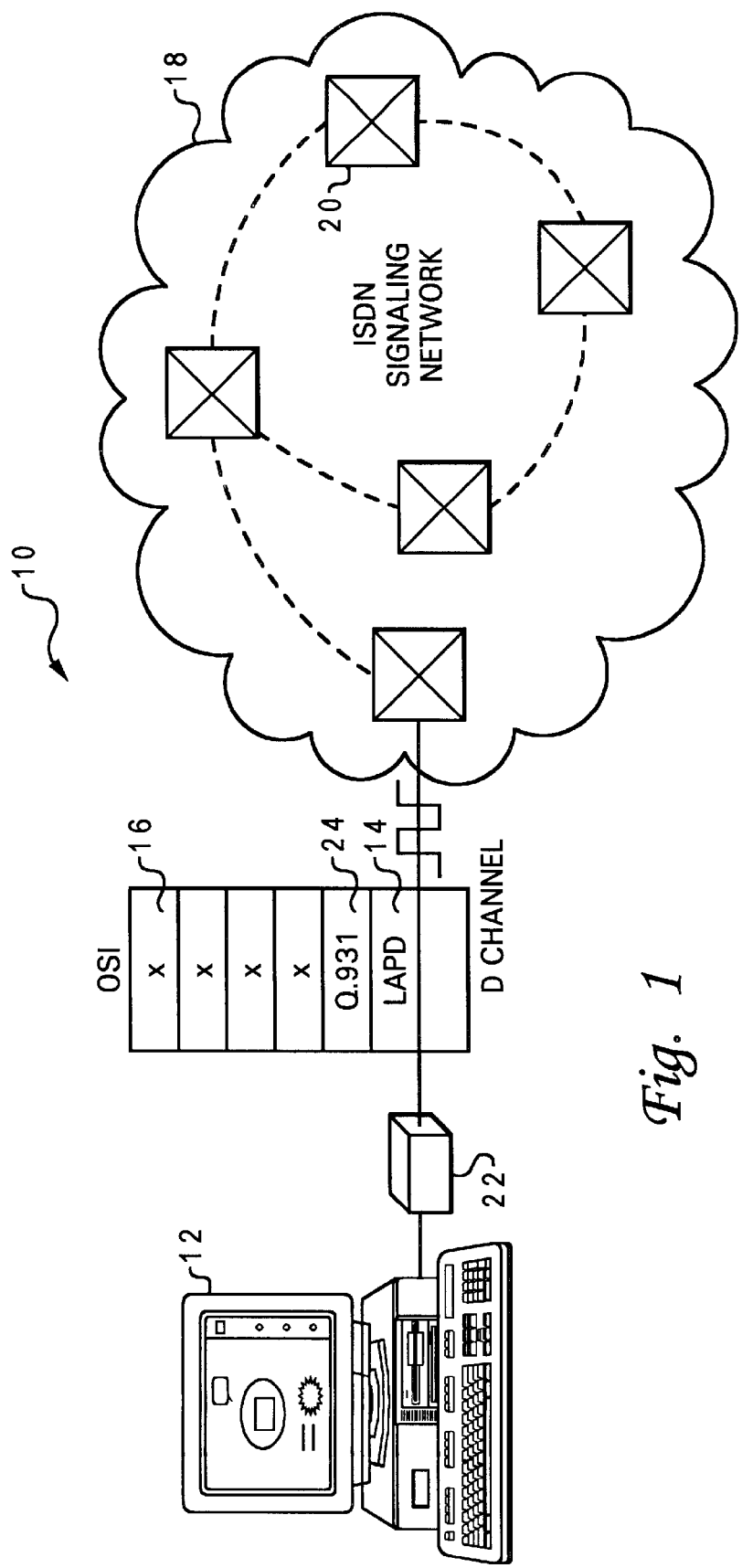
FIG. 1 depicts a block diagram of a Integrated Services Digital Network in which a preferred embodiment of the present invention may be implemented.

With reference now to the figures and in particular with reference to FIG. 1, there is depicted a block diagram of an illustrative embodiment of a telecommunication system with which the present invention may advantageously be utilized. The illustrative embodiment depicted in FIG. 1 is a computer workstation linked into an Integrated Services Digital Network, however, as will become apparent from the following description, the present invention may also be applied to any type of data processing, telephony or information handling system.

As illustrated in FIG. 1, the telecommunication system 10 includes a computer workstation or data processing system 12 linked to an Integrated Services Digital Network (ISDN) 18. In the depicted embodiment, the computer 12 is connected or linked to a switch stream 20 within the ISDN 18 through a modem 22. To ensure that voice and signaling or data and signaling information can be transmitted simultaneously within the ISDN 18, multiple channels are provided as defined by the International Telecommunication Union (ITU) in a series of protocol specifications. These channels are identified as B-channels and D-channels respectively. The B-channels are used for information transfer, such as speech, text, data and images. As shown in FIG. 1, the D-channel is used for call control signaling procedures and may also be used to carry packet-switched data. The call control signaling information on the D-channel is used to establish, supervise and release the circuit-switched connections 20 being requested for.

Referring once again to FIG. 1, there is shown an Open Systems Interconnection (OSI) model 16 for depicting a layered signaling protocol architecture used for link establishment and data communication flow within the telecommunication system 10. The model 16 provides for seven layers of interactions that occur between terminals and are defined by the International Telecommunications Union (ITU) in a series of protocol specifications. As shown in FIG. 1, the Link Access Protocol for the D-channel (LAPD) defined by the ITU-T Q.921 protocol specification is the second layer (Layer-2) 14 with the ITU-T Q.931 protocol specification defining the third layer (Layer-3) 24.

Figure 2:
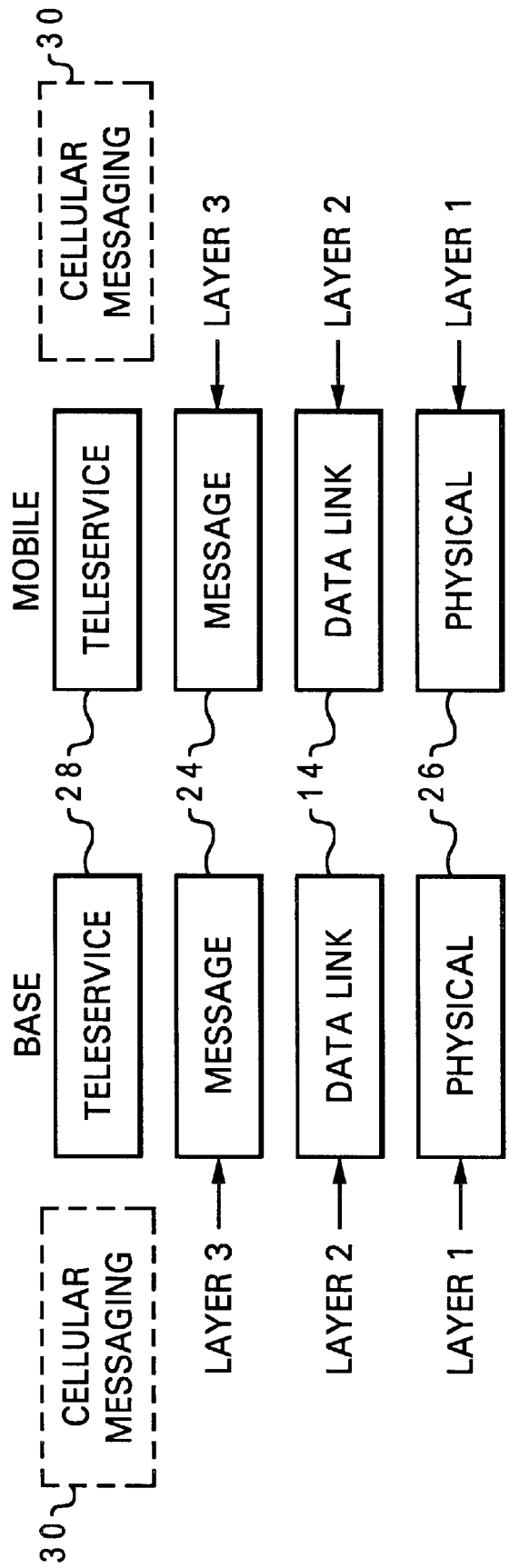
FIG. 2 is a high level block diagram of an air-interface model in which a preferred embodiment of the present invention may be implemented.

Turning now to FIG. 2, a high level block diagram depicting an air interface model for cellular messaging 30 which also uses the OSI seven layered model shown in FIG. 1 in accordance with the present invention is illustrated. As shown in FIG. 2, the first layer (Layer-1) 26 is a physical layer that deals with the radio interface, burst, slots, frames, and superframes in telecommunication interactions. The second layer 14 (Layer-2) is the data link that handles the data packaging, error correction and is the layer in which the method of the preferred embodiment of the present invention is applied. The third layer 24 (Layer-3) is the message layer, which creates, and handles messages sent and received across the air. The remaining four upper application layers represent the teleservice 28 currently being used, such as voice and messaging transactions, or future services like on-air programming.

Referring now to FIG. 3, there is shown a selective reject frame SREJ frame 32 that is sent by a transmit terminal along the Layer-2 D-channel for decoding by a receive terminal when the transmit terminal is reporting missing frame(s) for retransmittal that will be more fully described below. The frame 32 is structured or formatted in accordance with the ITU-T Q.921 protocol specification and consists of a variable N bytes each having a length of eight (8) bits 34. As shown in FIG. 3, at the start 36 and end 44 of frame 32 is a flag sequence consisting of one 0 bit followed by six contiguous 1 bits and one zero. The flag preceding the address field 38 is defined as the opening flag 36 and the flag following the Frame Check Sequence (LSB) 43 is defined as the closing flag 44 so that the receiving terminal knows to decode the information formatted between the opening and closing flags.

Referring once again to FIG. 3, the frame 32 includes an address field format which contains the address field extension bits, a command/response bit (C/R), a data link layer Service Access Point Identifier (SAPI) subfield 37, and a Terminal Endpoint Identifier (TEI) subfield 38. These two bytes define the type of application that transfers messages on the data link connections carried on the D-channel. The SAPI 37 identifies a point at which data link layer services are provided by a data link layer entity to a Layer-3 or management entity. The control field 40 is shown as the fourth and fifth byte and identifies the sequence number of the next expected (oldest and first missing) frame referred to as N(R). It is this field that is decoded by a receive terminal when missing frames are being reported in accordance with the ITU-T Q.921 specification. The information field 46 lists a sequence of missing frames, sequentially, if there is more than one missing frame, as will be more fully described below. The frame check sequence bytes MSB 42 and LSB 43 are used for transmission error checking. In operation, the transmit terminal sends out the SREJ frame 32 with the control field parameters 40 set and a list of missing frames which are decoded by a receive terminal. The transmit terminal upon receiving the SREJ frame retransmits those listed missing frames back to the receive terminal.

Figure 4:
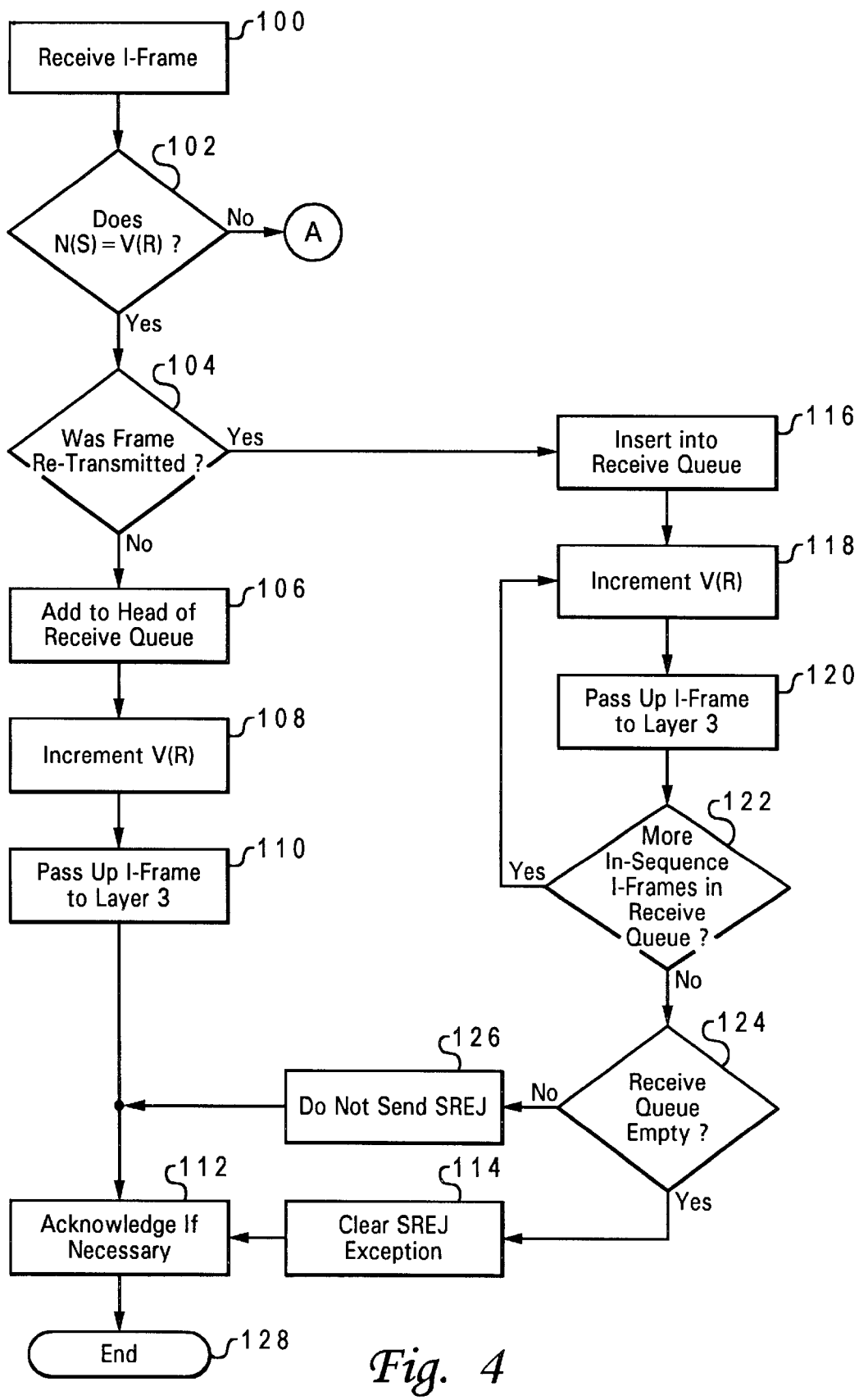
FIG. 4 is a high-level logic flow diagram of a method for partial reporting of missing sequence numbered information frames in accordance with a preferred embodiment of the present invention.

Referring now to FIG. 4, there is shown a high-level logic flow diagram of a method for partial reporting of missing sequence numbered information frames in accordance with a preferred embodiment of the present invention. As shown in step 100, at the layer 2 or data link layer 14, a receive terminal receives a sequence numbered information frame from a transmit terminal wherein the receive terminal determines if it is out of sequence. The receive terminal does this by checking the sequence numbered information frame to see if N(S) is equal to a state variable V(R), as shown in step 102. Given the exchange of information frames between two terminals (a transmit and receive terminal) using the LAPD protocol, N(S) is the sequence number of the received sequence numbered information frame and V(R) is the sequence number of the next expected sequence numbered information frame that the receive terminal is expecting. By way of example but not of limitation, if V(R) is sequence numbered information frame "ten", the expected sequence numbered information frame, and N(S) is sequence numbered information frame "ten", the received sequence numbered information frame, then N(S) equals V(R) and the expected sequence numbered information frame has been received.

Referring once again to FIG. 4, when N(S) equals V(R), the process proceeds to step 104, wherein the receive terminal determines if the sequence numbered information frame has been retransmitted. If the information frame has not been retransmitted the process proceeds to step 106, wherein the sequence numbered information frame is added to the head of the receive terminal's receive queue. Next, in step 108, the receive terminal increments V(R) by one, the next in-sequence numbered information frame expected to be received. When the receive terminal receives the first frame and consecutive in-sequence frames thereafter they are passed up to layer 3 or the message layer 14, as shown in step 110. The receive terminal may acknowledge to the transmit terminal, as shown in step 112, that it has received all sequence numbered information frames and ends at 128. The process repeats itself when the receive terminal receives subsequent sequence numbered information frames from the transmit terminal.

Turning once again to FIG. 4, if in step 104 the sequence numbered information frame is a retransmitted frame it is placed as shown in step 116 into the receive terminals receive queue. The receive terminal then increments V(R) by one, shown in step 118 and passes the sequence numbered information frame just placed in the receive queue if in sequence to layer 3 or the data layer 14, as shown in step 120. When receiving a sequence numbered information frame that has been retransmitted and placed in the queue, the queue is checked to see if more sequence numbered information frames are now in-sequence, as shown in step 122. If there are more in-sequence numbered information frames in the receive queue, the process loops through steps 118 and 120, incrementing the next expected sequence numbered information frame and passing that information to the message layer 14 until an out of sequence event occurs. The receive terminal then checks to see if its receive queue is empty, step 124, and if it is then it clears a SREJ exception since it expects no retransmitted frames. Once again, the receive terminal may acknowledge to the transmit terminal, as shown in step 112, that it has received all sequence numbered information frames and ends at 128, or the process begins again at step 100 to receive the next information frame. However, if the receive terminal still has information frames in its receive queue, then one or more in-sequence information frames have still not been received. In this state, the receive terminal still waits to receive more information frames, sends out an acknowledgement if necessary and does not send a SREJ response frame, as shown in steps 126 and 112. The process in which a selective reject SREJ response frame 32 is now described below with reference to FIG. 5.

Figure 5:
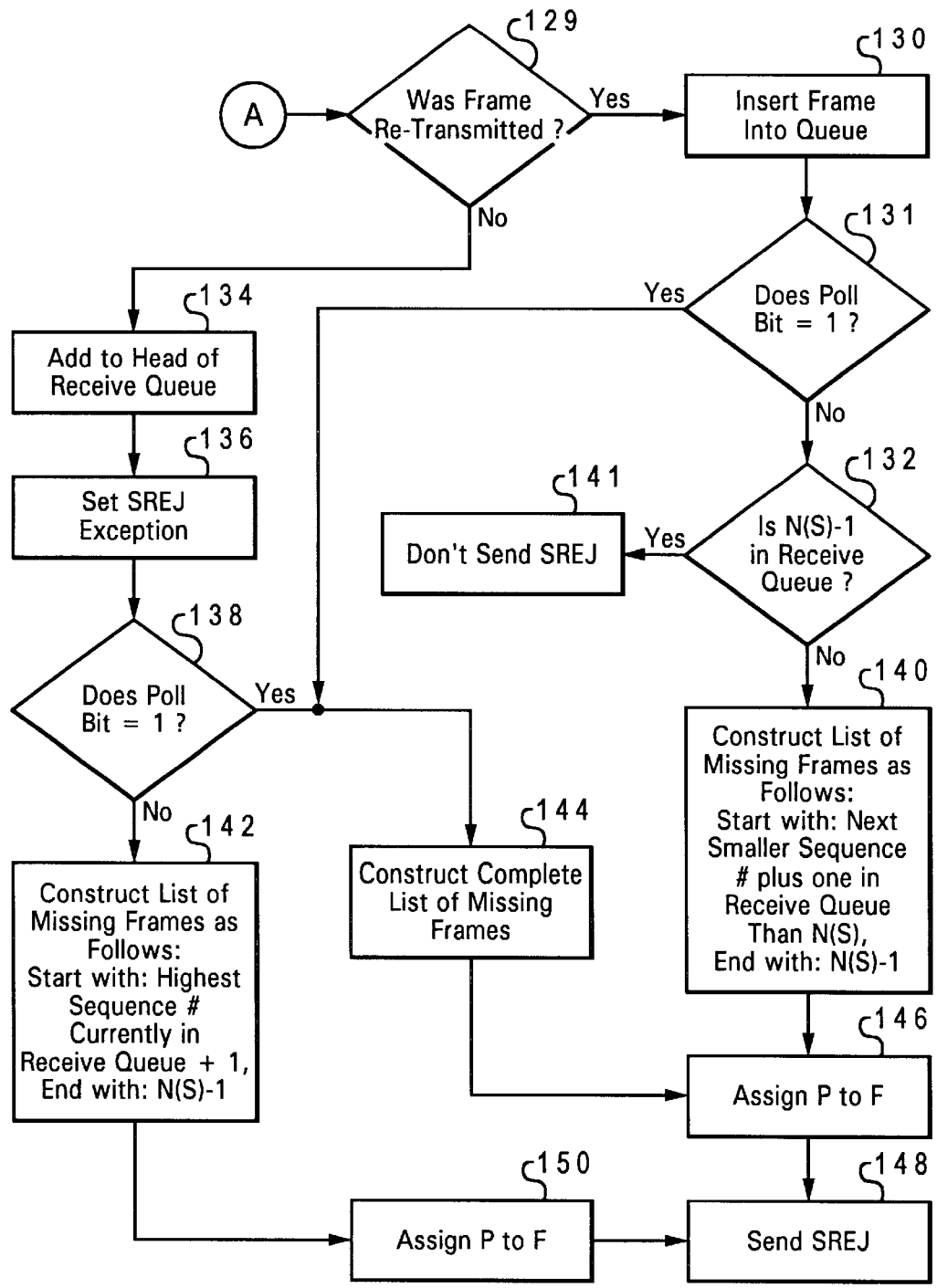
FIG. 5 is a continuation of the high-level logic flow diagram shown in FIG. 4.

With reference now to FIGS. 4 and 5, if N(S) does not equal V(R), then the information frame is out-of-sequence and the receive terminal checks to see if the received sequence numbered information frame has been retransmitted, shown as step 129 in FIG. 5. Continuing to refer to FIG. 5, if the sequence numbered information frame was not retransmitted, then as shown in step 134, it is added to the head of the receive terminal's receive queue. The process then proceeds to step 136 and sets an SREJ response exception state. The SREJ response is used to initiate a more efficient error recovery by selectively requesting the retransmission of one or more information frames following the detection of sequence errors. The receive terminal then checks the sequence numbered information frame to see if its poll bit has been set, as shown in step 138.

If the information frame has its poll bit set to or equal to one then the transmit terminal indicates that it has retransmitted all required or previously requested sequence numbered information frames and the receive terminal constructs a complete list of missing frames and places the list in information field 46 of the SREJ frame 32 and assigns the value of the poll bit to an F bit in SREJ frame 32, as shown in steps 144 and 146. Setting the F bit indicates to the transmit terminal that the receive terminal has acknowledged receipt of a frame with a poll bit set. The receive terminal then sends the SREJ response frame 32 to the transmit terminal, as shown in step 148, to prompt the transmit terminal to retransmit the missing sequence numbered information frames listed in information field 46 and N(R) 41, the second byte of the control field.

If the sequence numbered information frame has its poll bit set to zero and it is received out-of-sequence and also not a retransmitted frame, then the receive terminal constructs a list of missing sequence numbered information frames by starting with the highest sequence number currently in the receive queue plus one and ending with N(S)−1, wherein the first byte goes into the N(R) 41 field and the remainder of the list is placed in the information field 46 of the SREJ frame 32, as shown in step 142. The receive terminal then assigns the value of the poll bit to the F bit in SREJ frame 32, as shown in step 150. Once again, setting the F bit indicates to the transmit terminal that the receive terminal has a frame with the poll bit set. The receive terminal then sends the SREJ response frame 32 to the transmit terminal, as shown in step 148, to prompt the transmit terminal to retransmit the missing sequence numbered information frames listed in N(R) field 41 and information field 46.

Referring once again to FIG. 5, if in step 129 the sequence numbered information frame was retransmitted it is inserted in the proper sequence location in the receive terminal's receive queue as shown in step 130. The receive terminal once again checks to see if the poll bit is set to or equal to one as shown in FIG. 131. If the poll bit is equal to one, the receive terminal constructs a complete list of missing frames and places the list in information field 46 and N(R) field 41 of the SREJ frame 32 and assigns the value of the poll bit to the F bit in SREJ frame 32, as shown in steps 144 and 146. The receive terminal then sends the SREJ response frame 32 to the transmit terminal, as shown in step 148, to prompt the transmit terminal to retransmit the missing information frames and N(R) 41 listed in information field 46.

If the poll bit does not equal one having a value of zero and the frame has been retransmitted, the sequence numbered information frame is checked to see if the preceding sequence numbered information frame is N(S)–1 in the receive queue, shown in step 132. If the preceding sequence numbered information frame "N(S)–1" is in the receive queue, then no SREJ frame response is required because a SREJ frame has already been sent, as shown in step 141. However, if in step 132, N(S)–1 is not in the receive queue the receive terminal then constructs a list of missing sequence numbered information frames by starting with one plus the next smaller sequence number currently in the receive queue than N(S) and ending with N(S)–1 and places this list in information field 46 and first byte N(R) 41 of the SREJ frame 32, as shown in step 142. The receive terminal then assigns the value of the poll bit to the F bit in SREJ frame 32, as shown in step 146. Once again, setting the F bit indicates to the transmit terminal that the receive terminal has a frame with the poll bit set. The receive terminal then sends the SREJ response frame 32 to the transmit terminal, as shown in step 148, to prompt the transmit terminal to retransmit the missing information frames listed in information field 46 and N(R) 41.

Figure 6:
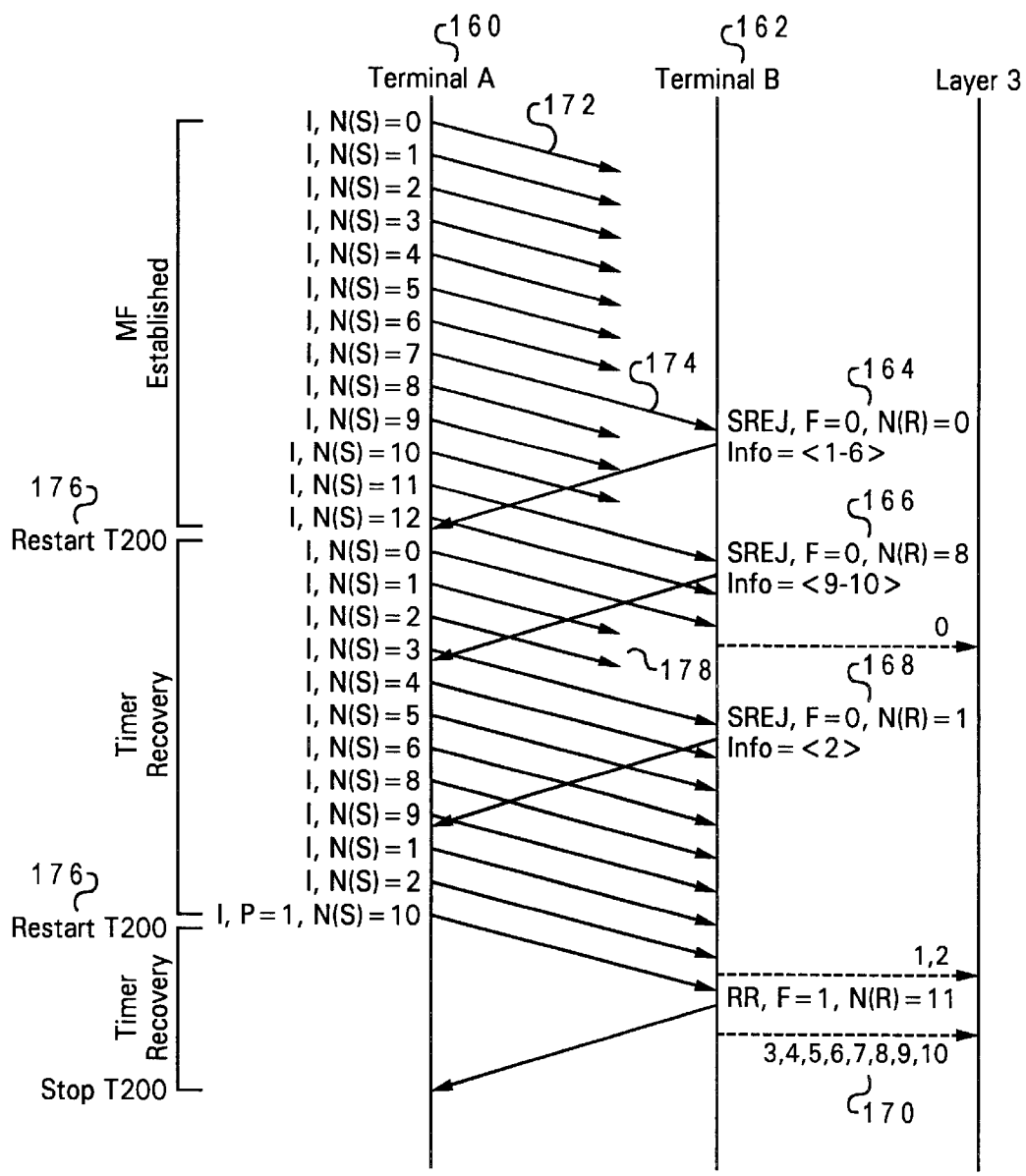
FIG. 6 is a diagram depicting one scenario in which the preferred embodiment of the present invention may be used.

Referring now to FIG. 6, there is shown a diagram depicting one scenario in which the preferred embodiment of the present invention may be used. As shown in FIG. 6, the point-to-point data link between terminal A 160 and terminal B 162 is initially subjected to a severe error condition (possibly a microwave fade on a microwave link), causing frames 0 through 6 172 to be lost in transmit. Frame 7 174 gets through to terminal B 162 which prompts a SREJ response 164 to be sent requesting retransmission of frames 0–6 172 (so far the actions are dictated by the existing Q.921 standard). Meanwhile, terminal A 160 continues to send Information "I" frames to terminal B 162. It has already sent frames 8 through 12 before it receives the SREJ response 164 from terminal B 162. Upon receiving the SREJ, it immediately goes into the Timer Recovery Mode 176 (restarting timer T200) and commences retransmission beginning at frame 0. Note that frames 8 through 10 have been lost in transmit. So upon receiving frame 11 out of sequence, terminal B 162 constructs a list missing frames starting at one greater than the largest sequence number currently in the receive queue (7+1=8) and ending at N(S)–1=11–1=10 (so the SREJ frame contains sequence numbers 8 through 10). This is described above in detail with reference to FIGS. 4 and 5. In the middle of retransmitting (right after frame 3) due to the first SREJ 164, terminal A 160 receives the second SREJ 166, and the listed frames are marked for retransmission.

As shown in FIG. 6, the retransmitted frames 1 and 2 178 have been lost in transmission. Upon receiving frame 3, terminal B 162 constructs a list of missing frames starting at one greater than the next smaller sequence number in the receive queue (0+1=1) and ending at N(S)–1=3–1=2 (so the SREJ frame contains sequence numbers 1 and 2) and sends another SREJ response 168. Once again, this is described above in detail with reference to FIGS. 4 and 5. Meanwhile, terminal A 160 continues re-transmitting due to the two earlier SREJ frames 164 and 166, respectively. It should be noted that terminal B does not send a SREJ frame after step 168 because the N(S)–1 check fails, indicating that a SREJ frame has already been sent. After transmitting frame 9, it receives the SREJ and retransmits the requested frames (1 and 2). It then retransmits the last outstanding frame (10), sets the Poll bit, clears the SREJ exception, and restarts timer T200 178.

The present invention provides for a telecommunication system that maintains communication between terminals in the presence of real time errors. The method and system of the present invention is unique in that the ITU-T protocol specification provides no procedure for certain sequence error conditions which may arise on links using the LAPD protocol for which the standard provides no method of handling.

It is also important to note that although the present invention has been described in the context of a fully functional telecommunication system, those skilled in the art will appreciate that the mechanisms of the present invention are capable of being distributed as a program product in a variety of forms to any type of information handling system, and that the present invention applies equally regardless of the particular type of protocol utilized to actually establish a link connection. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for partial reporting of missing information frames within a telecommunication system, comprising the steps of:

receiving a sequence numbered information frame from a transmit terminal at a receive terminal;

determining if said sequence numbered information frame is out of sequence;

responsive to determining said sequence numbered information frame is out of sequence, determining if a poll bit is set;

responsive to determining that said poll bit is not set, determining if said sequence numbered information frame is new;

responsive to determining said sequence numbered information frame is new, constructing a list of missing sequence numbered information frames beginning with a missing sequence number one greater than the largest sequence number in said receive terminal's receive queue and ending with said sequence numbered information frame minus one; and sending a selective reject SREJ frame response to said transmit terminal containing said list of missing sequence numbered information frames for re-transmittal.

2. The method for partial reporting of missing information frames within a telecommunication system according to claim 1, wherein the step of determining if said sequence numbered information frame is new; further comprises:

determining said sequence numbered information frame is retransmitted and said poll bit is set to zero thereby constructing a list of missing sequence numbered information frames beginning with a smallest missing sequence number plus one and ending with said sequence numbered information frame minus one; and sending a selective reject SREJ frame response to said transmit terminal containing said list of missing numbered information frames for re-transmittal.

3. The method for partial reporting of missing information frames within a telecommunication system according to claim 1, wherein the step of sending a selective reject frame further comprises:
assigning an F bit in said SREJ frame to the value of said poll bit.

4. The method for partial reporting of missing information frames within a telecommunication system according to claim 2, wherein the step of sending a selective reject frame further comprises:
assigning an F bit in said SREJ frame to the value of said poll bit.

5. The method for partial reporting of missing information frames within a telecommunication system according to claim 1, wherein the step of sending a selective reject frame further comprises:
setting a predetermined T200 time interval.

6. The method for partial reporting of missing information frames within a telecommunication system according to claim 1, wherein the step of receiving a sequence numbered information frame further comprises:
passing said sequence numbered information frame to an upper layer when said sequence numbered information frame is in-sequence.

7. The method for partial reporting of missing information frames within a telecommunication system according to claim 1, wherein the step of determining if said sequence numbered information frame is out of sequence further comprises:
Comparing said sequence numbered information frame's sequence number N(S) to a state variable V(R) wherein V(R) is a sequence number of a next expected sequence numbered information frame.

8. The method for partial reporting of missing information frames within a telecommunication system according to claim 1, wherein the step of determining if said sequence numbered information frame is out of sequence further comprises:
inserting said sequence numbered information frame into a proper location of said receive terminal's receive queue.

9. The method for partial reporting of missing information frames within a telecommunication system according to claim 1, wherein the step of determining if said sequence numbered information frame is new; further comprises:
determining said sequence information frame is retransmitted and said poll bit is set to one thereby constructing a complete list of missing sequence numbered information frames and sending a selective reject SREJ frame response to said transmit terminal containing said list of missing sequence numbered information frames for re-transmittal and assigning an F bit to the value of said poll bit.

10. The method for partial reporting of missing information frames within a telecommunication system according to claim 6, wherein the step of passing said sequence numbered information frame to a data layer when said sequence numbered information frame is in-sequence further comprises:
clearing a SREJ exception when said receive queue of said receive terminal is clear.

11. An information handling system, comprising:
means for receiving a sequence numbered information frame from a transmit terminal at a receive terminal;
means for determining if said sequence numbered information frame is out of sequence;
means for determining if a poll bit is set when said sequence numbered information frame is out of sequence;
means for determining if said sequence numbered information frame is new when said poll bit is not set;
means for constructing a list of missing sequence numbered information frames beginning with a missing sequence number one greater than the largest sequence number in said receive terminal's receive queue and ending with said sequence numbered information frame minus one when said sequence numbered information frame is new; and
means for sending a selective reject SREJ frame response to said transmit terminal containing said list of missing sequence numbered information frames for re-transmittal.

12. An information handling system according to claim 11, further comprising:
means for constructing a list of missing sequence numbered information frames beginning with a smallest missing sequence number plus one and ending with said sequence numbered information frame minus one when said sequence numbered information frame is re-transmitted and said poll bit is set to zero; and
means for sending a selective reject SREJ frame response to said transmit terminal containing said list of missing sequence numbered information frames for re-transmittal.

13. An information handling system according to claim 11, further comprising:
means for assigning an F bit in said SREJ frame to the value of said poll bit.

14. An information handling system according to claim 12, further comprising: means for assigning an F bit in said SREJ frame to the value of said poll bit.

15. An information handling system according to claim 11, further comprising:
means for setting a predetermined T200 time interval.

16. An information handling system according to claim 11, further comprising:
means for passing said sequence numbered information frame to a data layer when said sequence numbered information frame is in-sequence.

17. An information handling system according to claim 11, further comprising:
means for comparing said sequence numbered information frame's sequence number N(S) to a state variable V(R) wherein V(R) is a sequence number of a next information frame.

18. An information handling system according to claim 11, further comprising:
means for determining said sequence numbered information frame is retransmitted and said poll bit is set to one thereby constructing a complete list of missing sequence numbered information frames and sending a selective reject SREJ frame response to said transmit terminal containing said list of missing sequence numbered information frames for re-transmittal and assigning an F bit to the value of said poll bit.

19. An information handling system according to claim 16, further comprising:
means for clearing a SREJ exception when said receive queue of said receive terminal is clear.

20. A computer program product residing on a computer usable medium for upgrading a terminal to terminal link within an information handling system, comprising:

instruction means for receiving a sequence numbered information frame from a transmit terminal at a receive terminal;

instruction means for determining if said sequence numbered information frame is out of sequence;

instruction means for determining if a poll bit is set when said sequence numbered information frame is out of sequence;

instruction means for determining if said sequence numbered information frame is new when said poll bit is not set;

instruction means for constructing a list of missing sequence numbered information frames beginning with a missing sequence number one greater than the largest sequence number in said receive terminal's receive queue and ending with said sequence numbered information frame minus one when said sequence numbered information frame is new; and instruction means for sending a selective reject SREJ frame response to said transmit terminal containing said list of missing sequence numbered information frames for re-transmittal.

* * * * *